US008690233B2

(12) United States Patent
Preisler et al.

(10) Patent No.: US 8,690,233 B2
(45) Date of Patent: *Apr. 8, 2014

(54) CARPETED AUTOMOTIVE VEHICLE LOAD FLOOR HAVING A LIVING HINGE

(75) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/453,201

(22) Filed: Apr. 23, 2012

(65) Prior Publication Data

US 2013/0278007 A1 Oct. 24, 2013

(51) Int. Cl.
*B60N 3/12* (2006.01)
(52) U.S. Cl.
USPC ............... 296/193.07; 296/39.3; 296/97.23
(58) Field of Classification Search
USPC .................... 296/193.07, 97.23, 39.3
See application file for complete search history.

(56) References Cited

U.S. PATENT DOCUMENTS

| | | | |
|---|---|---|---|
| 5,502,930 A | 4/1996 | Burkette et al. |
| 5,915,445 A | 6/1999 | Rauenbusch |
| 6,050,630 A | 4/2000 | Hochet |
| 6,102,464 A | 8/2000 | Schneider et al. |
| 6,435,577 B1 | 8/2002 | Renault |
| 6,537,413 B1 | 3/2003 | Hochet et al. |
| 6,655,299 B2 | 12/2003 | Preisler et al. |
| 6,682,675 B1 | 1/2004 | Vandangeot et al. |
| 6,682,676 B1 | 1/2004 | Renault et al. |
| 6,720,058 B1 | 4/2004 | Weeks et al. |
| 6,748,876 B2 | 6/2004 | Preisler et al. |
| 6,790,026 B2 | 9/2004 | Vandangeot et al. |
| 6,823,803 B2 | 11/2004 | Preisler |
| 6,843,525 B2 | 1/2005 | Preisler |
| 6,890,023 B2 | 5/2005 | Preisler et al. |
| 6,918,625 B2 | 7/2005 | Storto et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,059,646 B1 | 6/2006 | DeLong et al. |
| 7,090,274 B1 | 8/2006 | Khan et al. |
| 7,399,515 B1 | 7/2008 | Thele |
| 7,628,440 B2 | 12/2009 | Bernhardsson et al. |
| 7,909,379 B2 | 3/2011 | Winget et al. |
| 7,919,031 B2 | 4/2011 | Winget et al. |
| 8,117,972 B2 | 2/2012 | Winget et al. |
| 2004/0037995 A1 | 2/2004 | Nicolai et al. |
| 2005/0189674 A1 | 9/2005 | Hochet et al. |
| 2006/0255611 A1 | 11/2006 | Smith et al. |
| 2008/0145635 A1 | 6/2008 | Stoll et al. |
| 2008/0185866 A1 | 8/2008 | Tarrant et al. |
| 2010/0026031 A1 | 2/2010 | Jouraku |
| 2010/0060038 A1 | 3/2010 | Takakura et al. |

*Primary Examiner* — Joseph Pape
(74) *Attorney, Agent, or Firm* — Brooks Kushman P.C.

(57) ABSTRACT

A carpeted automotive vehicle load floor including a composite panel having first and second reinforced thermoplastic skins and a thermoplastic cellular core disposed between and bonded to the skins is provided. The first skin as a top surface. A cover having top and bottom surfaces is spaced apart from the composite panel. A substantially continuous top covering layer is bonded to the top surface of the panel and the top surface of the cover to at least partially form a carpeted load floor having a carpeted cover. An intermediate portion of the top covering layer between the cover and the panel is not bonded to either the panel or the cover to form a living hinge which allows the carpeted cover to pivot between different use positions relative to the rest of the load floor.

20 Claims, 3 Drawing Sheets

CARPETED AUTOMOTIVE VEHICLE LOAD FLOOR HAVING A LIVING HINGE

TECHNICAL FIELD

This invention relates, in general, to the field of carpeted panels having a sandwich-type composite structure with a cellular core and, in particular, to such panels which have living hinges and which at least partially form automotive vehicle load floors.

OVERVIEW

Sandwich-type panels having cellular cores have very important characteristics because of their light weight and high strength. Conventionally, such panels are constructed by sandwiching a cellular core having low strength characteristics between two skins, each of which is much thinner than the cellular core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or non-woven thermoplastic material. The skins are typically pre-heated outside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and the manufacturing cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,502,930; 5,915,445; 6,050,630; 6,102,464; 6,435,577; 6,537,413; 6,655,299; 6,682,675; 6,748,876; 6,790,026; 6,682,676; 6,825,803; 6,843,525; 6,890,023; 6,981,863; 7,090,274; 7,909,379; 7,919,031; 8,117,972; 2006/0255611; and 2008/0185866.

One problem associated with living hinges of the prior art load floors having such panels is that the panels are quite strong but the living hinges may not be strong enough during extended use. Also, the cost of making such living hinges may be significant on a mass production basis.

SUMMARY OF EXAMPLE EMBODIMENTS

An object of at least one embodiment of the present invention is to provide a carpeted automotive vehicle load floor having at least one light-weight and strong sandwich-type composite panel having a living hinge made from a covering layer wherein the living hinge is strong enough so it functions properly during extended use without the need for additional materials.

In carrying out the above object and other objects of at least one embodiment of the invention, a carpeted automotive vehicle load floor is provided. The load floor includes a composite panel having first and second reinforced thermoplastic skins and a thermoplastic cellular core disposed between and bonded to the skins. The first skin having a top surface. The load floor also includes a cover having top and bottom surfaces. The cover is spaced apart from the composite panel. The load floor further includes a substantially continuous top covering layer bonded to the top surface of the panel and the top surface of the cover to at least partially form a carpeted load floor having a carpeted cover. An intermediate portion of the top covering layer between the cover and the panel is not bonded to either the panel or the cover to form a living hinge which allows the carpeted cover to pivot between different use positions relative to the rest of the load floor.

The load floor may also include a bottom covering layer substantially continuous with the top covering layer and bonded to the bottom surface of the cover. The living hinge may include a portion of the bottom covering layer bonded to the intermediate portion of the top covering layer.

The living hinge may be a two-way living hinge.

The top covering layer may be a thermoplastic covering layer such as a thermoplastic resin carpet.

A portion of the composite panel may have a reduced thickness to form a depression which receives the carpeted cover in at least one of the use positions. The thickness of carpeted panel may be substantially equal to depth of the depression. The cover-receiving depression may receive the carpeted cover in two use positions. The cover may extend from the living hinge in opposite directions in the two use positions.

Each of the skins may be fiber reinforced and the thermoplastic skins and the core may be polypropylene.

The composite panel may have a thickness in the range of 5 to 25 mm.

At least one of the skins may be a woven skin.

The cover may include a second composite panel including third and fourth thermoplastic skins and a cellular core disposed between and bonded to the third and fourth thermoplastic skins.

Further in carrying out the above object and other objects of at least one embodiment of the present invention, a carpeted automotive vehicle load floor is provided. The load floor includes a composite panel having first and second reinforced thermoplastic skins and a thermoplastic cellular core disposed between and bonded to the skins. The first skin has a top surface. The load floor also includes a cover having top and bottom surfaces. The cover is spaced apart from the composite panel. The load floor further includes a substantially continuous covering layer including a top layer bonded to the top surface of the panel and the top surface of the cover to form a carpeted load floor having a carpeted cover. An intermediate portion of the top layer between the cover and the panel is not bonded to either the panel or the cover to at least partially form a living hinge which allows the carpeted cover to pivot between different use positions relative to the rest of the load floor. The covering layer includes a bottom layer substantially continuous with the top layer and bonded to the bottom surface of the cover. The living hinge includes a portion of the bottom layer bonded to the intermediate portion of the top layer.

The living hinge may be a two-way living hinge and the top layer may be a thermoplastic layer.

Still further in carrying out the above object and other objects of the present invention, a carpeted automotive vehicle load floor is provided. The load floor includes a composite panel having first and second reinforced thermoplastic skins and a thermoplastic cellular core disposed between and bonded to the skins. The first skin has a top surface. The load floor also includes a cover having top and bottom surfaces. The cover includes third and fourth thermoplastic skins and a cellular core disposed between and bonded to the third and fourth skins. The cover is spaced apart from the composite panel. The load floor further includes a substantially continuous top covering layer bonded to the top surface of the panel and the top surface of the cover to form a carpeted a carpeted load floor having a carpeted cover. An intermediate portion of the top covering layer between the cover and the panel is not bonded to either the panel or the cover to form a living hinge which allows the carpeted cover to pivot between different use positions relative to the rest of the load floor.

The load floor may further include a bottom covering layer substantially continuous with the top covering layer and bonded to the bottom surface of the cover. The living hinge may include a portion of the bottom covering layer bonded to the intermediate portion of the top covering layer.

The living hinge may be a two-way living hinge.

A portion of the composite panel may have a reduced thickness to form a depression which receives the carpeted cover in at least one of the use positions. Thickness of the carpeted panel may be substantially equal to depth of the depression.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
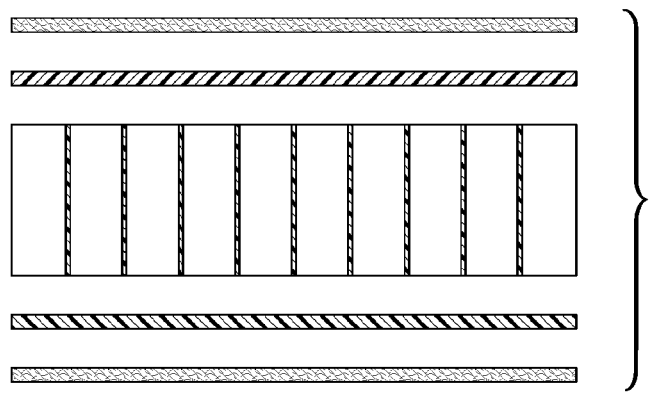
FIG. 1 is a side sectional view showing various separate layers of a prior art stack of thermoplastic-based layers of material.
Figure 2:
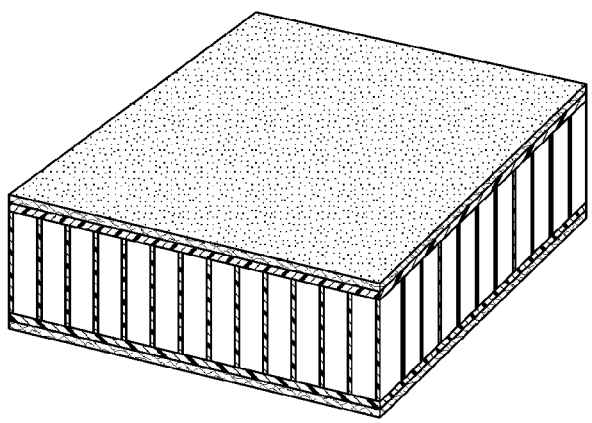
FIG. 2 is a top perspective sectional view, of the stack of FIG. 1 after low-pressure, cold compression molding.
Figure 3:
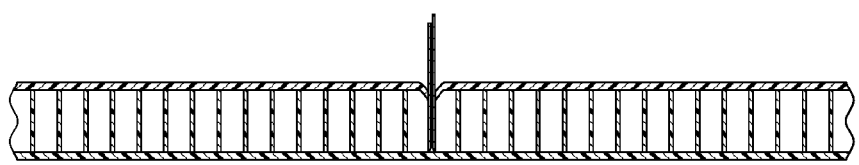
FIGS. 3 and 4 are side views, partially broken away and in cross section, of a prior art sandwich-type composite panel having a living hinge and method of making the living hinge.
Figure 4:
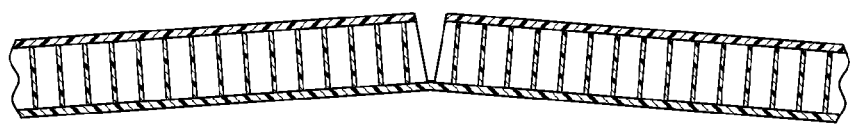
Figure 5:
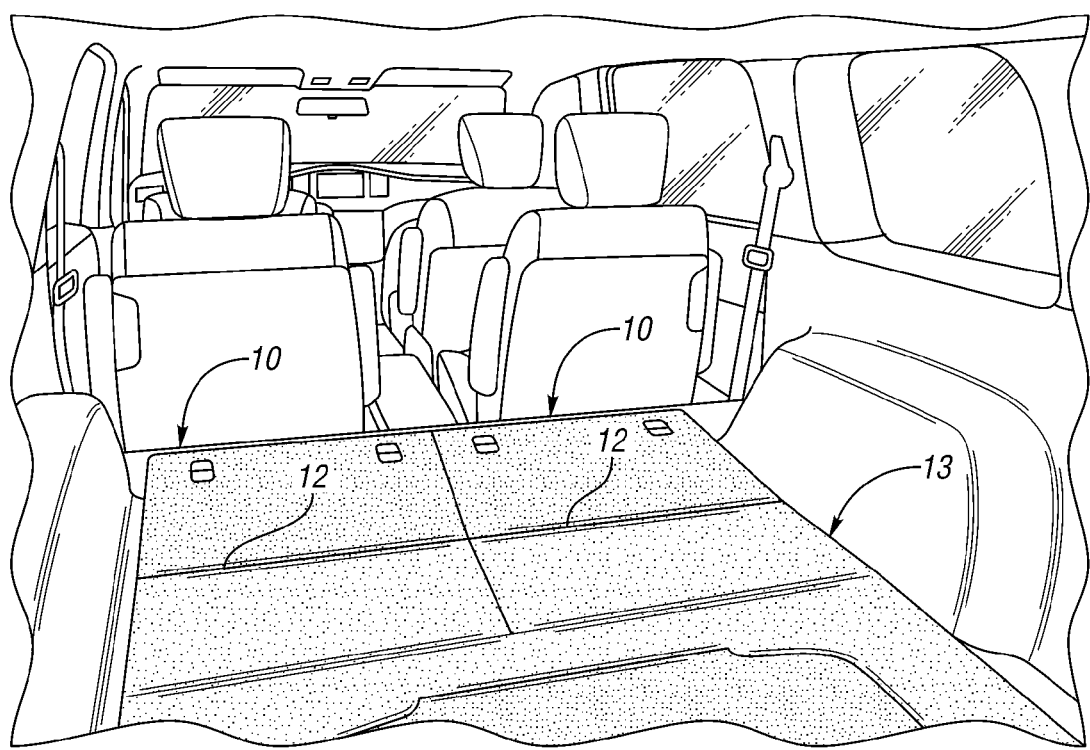
FIG. 5 is an environmental view, partially broken away, of a carpeted automotive vehicle load floor including a pair of carpeted sandwich-type composite panels having a living hinge constructed in accordance with at least one embodiment of the present invention.
Figure 6:
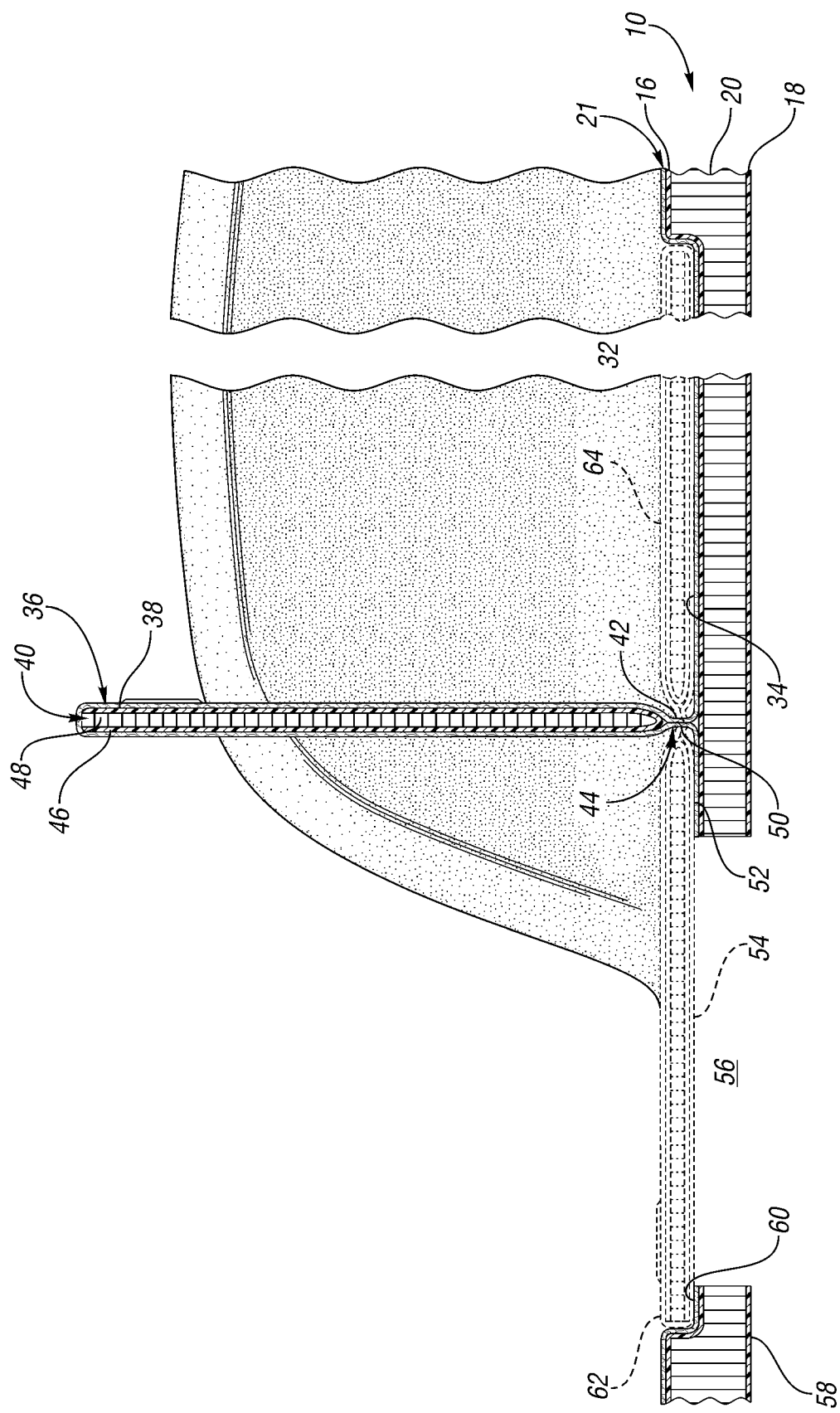
FIG. 6 is a side view, partially broken away and in cross section, of one of the panels of FIG. 5 with its carpeted cover shown in three different use positions, two of which are shown by phantom lines

Referring now to the FIGS. 5 and 6, one embodiment of a carpeted automotive vehicle load floor, generally indicated at 13, includes a pair of carpeted sandwich-type composite hinged panels 10. Each panel 10 has a living hinge 12 and forms a separate part of the vehicle load floor 13. However, it is to be understood that one or more hinged panels 10 constructed in accordance with at least one embodiment of the present invention may be used in a wide variety of environments besides the automotive vehicle environment of FIG. 5.

Each hinged panel 10 is typically manufactured by providing a stack of material located or positioned within a mold. The stack includes first and second reinforced thermoplastic skins 16 and 18, respectively, a thermoplastic cellular core 20 disposed between the skins 16 and 18 and a top layer of a substantially continuous covering layer generally indicated at 21, made of thermoplastics material which covers the first skin 16. The skins 16 and 18 are heated typically outside of the mold to a softening temperature. The mold is preferably a low-pressure, compression mold which performs a thermocompression process on the stack of materials.

A portion 32 of the composite panel 10 is crushed at a predetermined location simultaneously with the step of applying the pressure to compact and reduce the thickness of the cellular core 20 at the predetermined location for form a depression 34 which receives a carpeted cover, generally indicated at 36, of the hinged panel 10 at a pair of use positions as indicated by phantom lines in FIG. 6. The thickness of the carpeted cover 36 is substantially equal to the depth of the depression 34.

The top layer of the thermoplastic covering layer 21 not only covers the first skin 18, but also covers and is bonded to a skin 38 of a panel, generally indicated at 40, of the cover 36. An intermediate portion 42 of the layer 21 is not bonded to either the skin 16 or the skin 38 to form a living hinge, generally indicated at 44 (or 12 in FIG. 5). The living hinge 44 allows the carpeted cover 36 to pivot between the different use positions of FIG. 6.

The covering layer 21 may be a resin carpet and the resin may be polypropylene. One side or both sides of the cover 36 of the hinged panel 10 may be covered with the outer covering layer 21 which may be made of a woven or non-woven material (typically of the carpet type).

As shown in FIG. 6, the panel 40 also includes a skin 46 and a cellular core 48 disposed between and bonded to the skins 38 and 46. A bottom layer of the covering layer 21 extends from the top layer of the layer 21 and is bonded to and covers the top surface of the skin 46 to cover the bottom surface of the cover 36. A portion 50 of the bottom layer of the covering 21 is bonded to the intermediate portion 42 of the top layer of the covering 21 to further form the living hinge 44.

The cellular core 48 (as well as the core 20) may be a honeycomb core. In this example, the cellular core 48 and the core 20 have an open-celled structure of the type made up of tubes or a honeycomb, and it is made mainly of polyolefin and preferably of polypropylene. It is also possible to use a cellular structure having closed cells of the foam type. Alternatively, the panel 40 may be made of a solid material, such as a solid plastic part, to which the top and bottom layers of the layer 21 are bonded.

Each of the skins 16 and 18 (as well as the skins 38 and 46) may be fiber reinforced. The thermoplastic of the skins 16, 18, 38 and 46, the covering layer 21 and the cores 20 and 48 may be polypropylene. At least one of the skins 16, 18, 38 and 46 may be woven skin, such as polypropylene skin. Each of the skins 16, 18, 38 and 46 may be reinforced with fibers, e.g., glass fibers, carbon fibers or natural fibers. At least one of the skins 16, 18, 38 and 46 may advantageously be made up of woven glass fiber fabric and of a thermoplastics material.

The resulting hinged panel 10 may have a thickness in the range of 5 to 25 mm and the crushed portion of the panel 10 may have a thickness in the range of 3 to 15 mm. The depression 34 may have a depth in the range of 2 to 10 mm.

In one example method of making the hinged panel 10 including the panel 40, stacks of material may be pressed in a low pressure cold-forming mold 22. With respect to a part of the hinged panel 10, the stack is made up of the first skin 16, the cellular core 20, the second skin 18 and a portion of the covering layer 21, and is pressed at a pressure lying in the range of $10 \times 10^5$ Pa. to $30 \times 10^5$ Pa. The first and second skins 16 and 18 are preferably pre-heated to make them malleable and stretchable. Advantageously, in order to soften the first and second skins 16 and 18, respectively, heat is applied to a pre-assembly constituted by the stack made up of at least the first skin 16, of the cellular core 20, and the second skin 18 so that, while a part of the panel 10 is being formed in the mold, the first and second skins 16 and 18 have a forming temperature lying approximately in the range of 160° C. to 200° C., and, in this example, about 180° C. In like fashion, the cover 36 may be formed.

An end portion 52 of the bottom layer of the layer 21 is also bonded to the top surface of the skin 16 and helps to support the carpeted cover 36 in one of the use positions of the cover 36, as indicated in phantom at 54 in FIG. 6. In the position 54, the cover 36 encloses a storage area 56 between the panel 10 and another composite panel 58 having a depression 60 to receive a free end portion 62 of the cover 36. The panel 58 may also be a carpeted composite panel similar in construction to the hinged panel 10 having the cover 36.

In another use position, indicated at 64 by phantom lines, the cover 36 is completely received within the depression 34 to allow access to the storage area 56 without having to hold the cover 36 open as indicated by the solid line position of the cover 36 in FIG. 6

The covering layer 21 including its top and bottom layers is substantially continuous and may be formed from separate pieces of thermoplastic resin carpet which are subsequently bonded or fused together, such as by heat and/or pressure to carpet the entire top surface of the hinged panel 10 as well as the bottom surface of the cover 36.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A carpeted automotive vehicle load floor comprising:
a composite panel having first and second reinforced thermoplastic skins and a thermoplastic cellular core disposed between and bonded to the skins, the first skin having a top surface;
a cover having top and bottom surfaces and spaced apart from the composite panel; and
a substantially continuous top covering layer bonded to the top surface of the panel and the top surface of the cover to at least partially form a carpeted load floor having a carpeted cover, wherein an intermediate portion of the top covering layer between the cover and the panel is not bonded to either the panel or the cover to form a living hinge which allows the carpeted cover to pivot between different use positions relative to the rest of the load floor.

2. The load floor as claimed in claim 1, further comprising a bottom covering layer substantially continuous with the top covering layer and bonded to the bottom surface of the cover wherein the living hinge includes a portion of the bottom covering layer bonded to the intermediate portion of the top covering layer.

3. The load floor as claimed in claim 1, wherein the living hinge is a two-way living hinge.

4. The load floor as claimed in claim 1, wherein the top covering layer is a thermoplastic covering layer.

5. The load floor as claimed in claim 4, wherein the top covering layer is a thermoplastic resin carpet.

6. The load floor as claimed in claim 1, wherein a portion of the composite panel has a reduced thickness to form a depression which receives the carpeted cover in at least one of the use positions and wherein thickness of carpeted panel is substantially equal to depth of the depression.

7. The load floor as claimed in claim 6, wherein the cover-receiving depression receives the carpeted cover in two use positions and wherein the cover extends from the living hinge in opposite directions in the two use positions.

8. The load floor as claimed in claim 1, wherein each of the skins is fiber reinforced.

9. The load floor as claimed in claim 1, wherein the thermoplastic of the skins and the core is polypropylene.

10. The load floor as claimed in claim 1, wherein the composite panel has a thickness in the range of 5 to 25 mm.

11. The load floor as claimed in claim 1, wherein at least one of the skins is a woven skin.

12. The load floor as claimed in claim 1, wherein each of the skins is a woven skin.

13. The load floor as claimed in claim 1, wherein the cover comprises a second composite panel including third and fourth thermoplastic skins and a cellular core disposed between the bonded to the third and fourth thermoplastic skins.

14. A carpeted automotive vehicle load floor comprising:
a composite panel having first and second reinforced thermoplastic skins and a thermoplastic cellular core disposed between and bonded to the skins, the first skin having a top surface;

a cover having top and bottom surfaces and spaced apart from the composite panel; and a substantially continuous covering layer including a top layer bonded to the top surface of the panel and the top surface of the cover to at least partially form a carpeted load floor having a carpeted cover, wherein an intermediate portion of the top layer between the cover and the panel is not bonded to either the panel or the cover to form a living hinge which allows the carpeted cover to pivot between different use positions relative to the rest of the load floor, the covering layer including a bottom layer substantially continuous with the top layer and bonded to the bottom surface of the cover wherein the living hinge includes a portion of the bottom layer bonded to the intermediate portion of the top layer.

15. The load floor as claimed in claim 14, wherein the living hinge is a two-way living hinge.

16. The load floor as claimed in claim 14, wherein the top layer is a thermoplastic covering layer.

17. A carpeted automotive vehicle load floor comprising:
a composite panel having first and second reinforced thermoplastic skins and a thermoplastic cellular core disposed between and bonded to the skins, the first skin having a top surface;
a cover having top and bottom surfaces and comprising third and fourth thermoplastic skins and a cellular core disposed between and bonded to the third and fourth skins, the cover being spaced apart from the composite panel; and
a substantially continuous top covering layer bonded to the top surface of the panel and the top surface of the cover to form a carpeted load floor having a carpeted cover, wherein an intermediate portion of the top covering layer between the cover and the panel is not bonded to either the panel or the cover to form a living hinge which allows the carpeted cover to pivot between different use positions relative to the rest of the load floor.

18. The load floor as claimed in claim 17, further comprising a bottom covering layer substantially continuous with the top covering layer and bonded to the bottom surface of the cover wherein the living hinge includes a portion of the bottom covering layer bonded to the intermediate portion of the top covering layer.

19. The load floor as claimed in claim 17, wherein the living hinge is a two-way living hinge.

20. The load floor as claimed in claim 17, wherein a portion of the composite panel has a reduced thickness to form a depression which receives the carpeted cover in at least one of the use positions and wherein thickness of the carpeted panel is substantially equal to depth of the depression.

* * * * *